United States Patent Office 3,155,523
Patented Nov. 3, 1964

3,155,523
EXTRACTION OF COFFEE AROMA AND FLAVOR
Ismar M. Reich, Stamford, Conn., assignor to Standard Brands Incorporated, New York, N.Y., a corporation of Delaware
No Drawing. Filed Aug. 15, 1958, Ser. No. 755,133
15 Claims. (Cl. 99—71)

This invention relates to the extraction of aroma and flavor constituents from roasted coffee. It also relates to the production of a soluble or instant coffee having the aroma and flavor usually associated with freshly brewed roasted coffee.

It is common practice to produce soluble or instant coffee by extracting roasted coffee with hot water and then spray drying this extract. Instant coffee produced in this manner, termed "conventional instant coffee" hereinafter for convenience, is characterized in the dry state by the absence of the aroma of freshly roasted coffee and, after reconstitution with water, by lack of the aroma and flavor usually associated with freshly brewed roasted coffee. In this conventional method of making instant coffee, some of the aroma and flavor constituents of the roasted coffee are not extracted because they are not soluble in water while others are either lost by volatilization during the spray drying step or are damaged or destroyed by the action of hot water during the extraction step and the action of hot air during the drying step.

To avoid these deleterious effects on the aroma and flavor, it has been proposed to extract aroma and flavor constituents from roasted coffee by means of a non-aqueous solvent before extracting it with hot water and then combine the extracted material in the two extracts so obtained after removal of the solvent. Many non-aqueous solvents have been proposed for this purpose, for instance, alcohol, ether, benzene, toluene, aliphatic hydrocarbons such as pentane, hexane, heptane and octane, chlorinated aliphatic hydrocarbons such as methylene chloride, ethylene chloride, carbon tetrachloride and the like, liquid sulphur dioxide, liquid carbon dioxide and liquid ammonia. All of these solvents have serious disadvantages. Most of them are very difficult, if not impossible, to remove from the extracted material and consequently they contaminate the aroma and flavor quality of the extract. Some of these solvents extract an excessive amount of coffee fat which must be removed by fractionation of the extract before it can be used in instant coffee. Such additional processing always results in some loss of quality and intensity of the extract. Some of these solvents dissolve some flavor and aroma constituents to a much greater extent than other flavor and aroma constituents and therefore give an extract having poorly blended flavor and aroma. Still other solvents do not dissolve a sufficient amount of any of the valuable flavor and aroma constituents to be of any practical value. Some solvents react with the aroma and flavor constituents and thus modify or destroy them.

An object of the invention is to produce an extract of roasted coffee containing the aroma and flavor constituents thereof in a substantially unaltered form.

Another object of the invention is to provide an instant coffee having the natural aroma of freshly roasted coffee.

A further object of the invention is to provide an instant coffee with natural roasted coffee aroma and flavor which is stable for long periods under normal storage conditions.

It has now been found that certain fluorinated organic compounds have the unique and unexpected ability to extract from roasted coffee a broad spectrum of flavor and aroma constituents to give an extract which is greatly superior to extracts obtained with other solvents in that it possesses much more of the aroma and flavor quality of freshly roasted coffee. These fluorinated compounds are those with a boiling point at atmospheric pressure below 39° F. having the formula

or the formula $R_1F_2C-CF_2R_2$, wherein $R_1$ and $R_2$ stand for hydrogen, chlorine or bromine. Examples of such compounds are dichlorodifluoromethane, whose boiling point is $-21.64°$ F., monochlorodifluoromethane, whose boiling point is $-41.44°$ F., dichlorotetrafluoroethane, whose boiling point is 38.39° F. and monobromomonochlorodifluoromethane, whose boiling point is 25° F.

These compounds have two fluorine atoms on each carbon atom and are unusually stable chemically. This stability is a great advantage because the solvent will not react with the desired aroma and flavor components of roasted coffee. Compounds such as dichlorodifluoromethane are so chemically unreactive as to be non-toxic. In some tests, this compound has been found to be less toxic than carbon dioxide. These compounds are also non-flammable and consequently may be used safely in manufacturing operations.

Although these compounds have little or no toxicity, it is desirable to remove them completely from the extract for reasons of economy and to avoid contamination of the food products in which the extracts are used. This can be accomplished with little or no loss of the volatile aroma and flavor constituents because of the very low boiling point of the solvents. No loss takes place in the case of those solvents which boil much below 39° F. However, complete removal of dichlorotetrafluoroethane which boils at 38.39° F. may entail a slight loss of the aroma and flavor constituents. In spite of this, complete removal of this solvent leaves an extract which is far superior to extracts obtained with the solvents proposed in the prior art.

To prepare the extracts, liquid solvent is simply contacted with the roasted coffee, the resulting liquid extract is separated from the coffee and solvent is evaporated from the extract. The solvent-free extract is ready for use without further treatment.

It is well known that a large number of compounds in combination contribute to the aroma and flavor of roasted coffee. The solvents used in the present invention have the ability to extract a balanced combination of these aroma and flavor compounds and therefore fractionation of the extract is not required to improve its quality. This desirable blend of compounds is not obtained with the solvents heretofore proposed.

The fluorinated compounds used in the present invention having two fluorine atoms on each carbon atom are unique in that they give very good extracts of roasted coffee. In contrast, other fluorinated hydrocarbons having one or three fluorine atoms per carbon atom give very poor extracts of roasted coffee. The differences between these two classes of compounds are evident from the following table which gives the characteristics of representative members of each class.

| Name | Chemical Formula | Atmospheric B.P., °F. | No. of F Atoms on a C Atom | Quality of Extract |
|---|---|---|---|---|
| Trichloromonofluoromethane | $CCl_3F$ | 74.78 | 1 | Very poor. |
| Dichlorodifluoromethane | $CCl_2F_2$ | −21.64 | 2 | Excellent. |
| Monobromomonochlorodifluoromethane | $CBrClF_2$ | 25 | 2 | Very good. |
| Monochlorotrifluoromethane | $CClF_3$ | −114.6 | 3 | Very poor. |
| Tetrafluoromethane | $CF_4$ | −198.4 | 4 | (¹) |
| Dichloromonofluoromethane | $CHCl_2F$ | 48.06 | 1 | Very poor. |
| Monochlorodifluoromethane | $CHClF_2$ | −41.44 | 2 | Excellent. |
| Trifluoromethane | $CHF_3$ | −116.0 | 3 | Very poor. |
| Sym-dichlorotetrafluoroethane | $CCl_2-CClF_2$ | 38.39 | 2, 2 | Very good. |
| Monochloropentafluoroethane | $CClF_2-CF_3$ | −37.7 | 2, 3 | (²) |

¹ The vapor pressure of tetrafluoromethane is so great it could not be used as a liquid solvent at room temperature without special equipment.
² Extract yield too small to be evaluated.

The invention is illustrated by the following examples.

*Example 1*

100 grams of hot freshly roasted unground coffee beans were allowed to cool to room temperature in an atmosphere of carbon dioxide and were then broken up by pressing in a Carver laboratory press at 4,000 p.s.i.g. for 5 minutes. A typical sieve analysis of roasted coffee beans so pressed showed that 79.2% of the particles remained on a 20 mesh sieve, 11.3% passed through a 20 mesh sieve and 9.5% passed through a 40 mesh sieve. The pressed product was placed in a stainless steel pressure tight vessel of 360 cc. capacity and 220 grams of liquid dichlorodifluoromethane at room temperature were introduced into the vessel. The contents of the vessel were agitated by rotating the vessel on mechanical rollers for 30 minutes and then the liquid extract was drained from the vessel into an open container in which the solvent was allowed to evaporate at room temperature. The resulting product was a yellow-brown oil which had the aroma of freshly roasted and ground coffee. It was mixed with 40 grams of conventional instant coffee powder. A portion of this mixture was diluted with 9 times its weight of conventional instant coffee powder and this mixture was compared with the untreated conventional instant coffee for aroma and flavor quality. It was found that the aroma of the treated instant coffee possessed more of the aroma quality of freshly roasted and ground coffee than did the untreated instant coffee. It was also found that the treated instant coffee when reconstituted (both black and with cream) had considerably more of the aroma and flavor qualities of freshly roasted coffee than did the reconstituted untreated instant coffee. Also, the treated instant coffee powder was more attractive and looked more like ground roasted coffee than did the untreated instant coffee.

*Example 2*

Freshly roasted coffee beans were ground in a Fitzpatrick comminuting machine. 100 grams of this ground coffee (typical sieve analysis—74% of particles on 30 mesh sieve, 10% of particles on 40 mesh sieve and 15% of particles through 40 mesh sieve) were extracted with 305 grams of dichlorodifluoromethane in the manner described in Example 1. The solvent was allowed to evaporate from the resulting extract at room temperature in a carbon dioxide atmosphere leaving 4.57 grams of solvent-free extract. Two parts of this extract were mixed in a carbon dioxide atmosphere with 98 parts of conventional instant coffee powder. The aroma and flavor quality of the thus treated instant coffee was high and was comparable to the quality of the treated instant coffee obtained in Example 1.

*Example 3*

The process of Example 2 was repeated with the exception that 280 grams of monochlorodifluoromethane were used in place of the dichlorodifluoromethane. The aroma and flavor extract obtained amounted to 4.8 grams. It was mixed in a carbon dioxide atmosphere with conventional instant coffee powder in the ratio of 2 parts of extract to 98 parts of the conventional instant coffee. The thus treated instant coffee was found to have a high aroma and flavor quality close to the quality of the treated instant coffees containing dichlorodifluoromethane extract obtained in Examples 1 and 2.

*Example 4*

The process of Example 2 was repeated except that 275 grams of dichlorotetrafluoroethane were used as the solvent. The aroma and flavor extract thus obtained amounted to 2.85 grams. It was mixed in a carbon dioxide atmosphere with conventional instant coffee powder in the ratio of 2 parts of extract to 98 parts of the conventional instant coffee. The aroma and flavor quality of the resulting product was found to be high although slightly lower than the quality of the treated instant coffees obtained in Examples 2 and 3.

*Example 5*

The process of Example 2 was repeated except that 325 grams of monobromomonochlorodifluoromethane were used as the solvent. The aroma and flavor extract thus obtained amounted to 3.4 grams. It was mixed in a carbon dioxide atmosphere with conventional instant coffee powder in the ratio of 0.5 part of extract to 99.5 parts of the conventional instant coffee. The aroma and flavor quality of the resulting product was found to be high although not as high as the quality of instant coffee containing the same level of a dichlorodifluoromethane extract of roasted coffee and much higher than the quality of instant coffee containing the same level of a petroleum ether extract of roasted coffee made according to Example 7.

*Example 6*

A countercurrent extraction was carried out with dichlorodifluoromethane in a system consisting of two extractors each charged with 1540 pounds of ground roasted coffee operating under a pressure of about 135 pounds per square inch. The solvent was used at a ratio of about 5 pounds per pound of coffee, and a temperature of about 110° F. After filling an extractor with solvent, the extraction time was about 16 minutes in each extractor during which time the solvent was allowed to boil gently to provide agitation. The resulting solution of aroma and flavor constituents was passed at the end of each cycle into a distilling vessel in which the solvent was distilled at about 110° F. A total of 198 pounds of solvent-free extract was thus obtained from six extractor charges of roasted coffee.

At the end of each extraction, residual solvent was evaporated from the solvent extracted coffee grounds in the extractor disconnected from the system by heating for 2–3 hours under a pressure of 150 pounds per square inch by passing steam through a coil within the extractor.

The solvent-free coffee grounds so obtained were mixed with untreated fresh ground roasted coffee in the ratio of 1 part of the former to 4 parts of the latter and a conventional instant coffee powder was prepared therefrom. The solvent extract obtained as described above was mixed with this instant coffee in a ribbon blender in such proportion that the mixture contained 0.5% of aroma and flavor extract. The mixing operation and the packaging of the product were carried out in a carbon dioxide atmosphere to avoid oxidation of the product. This product was found to have the same high aroma and flavor quality as the products obtained in smaller scale extractions at the same aroma and flavor extract level.

*Example 7*

Freshly roasted ground coffee was extracted with 125 grams of petroleum ether under the conditions described in Example 1. The resulting solution was heated to a temperature of 50° C. under a pressure of 0.5–6.0 cm. of mercury absolute to remove the solvent. The 4.2 grams of extract thus obtained was mixed in a carbon dioxide atmosphere with conventional instant coffee powder in the ratio of 2 parts of extract to 98 parts of the conventional instant coffee. The thus treated instant coffee had a very poor aroma and flavor quality and low aroma intensity compared to the treated instant coffees obtained in Example 2.

This example illustrates the result obtained by extracting roasted coffee with petroleum ether under the conditions described in Gilmont Patent No. 2,563,233, which indicates that petroleum ether works exceedingly well in contrast to other solvents recommended in the prior art. This example shows that the Gilmont product is very inferior to products obtained in accordance with the present invention.

The roasted coffee extracted in the present invention may be roasted to any desired degree ranging from a very light roast to a very dark roast. Valuable extracts of high quality are obtained in all these cases. A roast color corresponding to or close to the color of commercial ground coffee is preferred.

While it is advisable for best results to use freshly roasted coffee, stale roasted coffee also yields good extracts. For instance, roasted coffee which had been exposed to air at room temperature for one week and then extracted with dichlorodifluoromethane yielded an extract with aroma and flavor of good quality only slightly inferior to the quality of the extract obtained from the freshly roasted coffee with the same solvent under identical conditions. Also the yield of extract was substantially the same in the two extractions.

The coffee may be extracted in the whole bean state or it may be comminuted to any desired extent. The yield of extract can be increased by the use of fine grinds without affecting extract quality. Reduction in size can be accomplished by pressing, grinding or crushing. A somewhat higher yield can be obtained from pressed coffee than from crushed or ground coffee of comparable particle size, but grinding is preferred for large scale operations because it is more economical. The yield of extract from a batch of coffee can be increased by repeated extractions. In order to reduce heating, cooling and solvent handling costs, extraction at or near ambient or room temperature is preferred but extracts of high quality can be obtained over a wide range of extraction temperatures.

The extracts obtained in accordance with the invention contain a high proportion of aroma and flavor constituents relative to coffee fat and therefore need not be fractionated to separate the fat before they are incorporated in conventional instant coffee. In this respect they offer a great advantage over extracts prepared with organic solvents proposed in the prior art. These extracts must be fractionated before use in instant coffee to avoid the presence of objectionable amounts of fat.

The extracts prepared in accordance with the invention may be incorporated in instant coffee at widely varying levels depending upon the desired intensity of the aroma and flavor. This level will generally vary between about 0.1% and about 6% based on the combined weight of instant coffee and extract. While levels above 6% may be used, they are not advisable because they do not produce a marked increase in intensity or quality of the aroma and tend to make the product appear unattractive in that it becomes non-flowing and difficult to spoon.

The aroma and flavor extracts obtained in accordance with the invention are stable for long periods under normal storage conditions. For instance, treated instant coffee prepared as described in Example 1 was tested when prepared and after storage for 9½ months in a closed container at room temperature. It was found that the aroma of the stored sample, although somewhat decreased, was still good. Experiments indicate that storage stability can be improved further by packaging the treated instant coffee in a substantially oxygen-free atmosphere.

Instead of incorporating the aroma and flavor extract in an instant coffee powder, it is also possible to use said extract for other flavoring purposes, as for example, in ice cream, candy and bakery products.

While it is preferred to separate the aroma and flavor extract from the solvent before the extract is incorporated in instant coffee, this is not essential. For instance, in the specific examples the liquid separated from the ground coffee can be mixed directly with conventional instant coffee powder and the solvent evaporated from the mixture.

The terms and expressions which have been employed herein are used as terms of description and not of limitation, and it is not intended, in the use of such terms and expressions, to exclude any equivalents of the features shown and described or portions thereof, since it is recognized that various modifications are possible within the scope of the invention claimed.

I claim:

1. A process of preparing a coffee extract which comprises extracting roasted coffee with a fluorinated compound having a boiling point at atmospheric pressure below 39° F. selected from the group consisting of

and $R_1F_2C-CF_2R_2$ wherein $R_1$ and $R_2$ are selected from the group consisting of hydrogen, chlorine and bromine, under temperature and pressure conditions such that the fluorinated compound is in a liquid state, separating liquid from the coffee and evaporating solvent from said liquid.

2. A process as claimed in claim 1 wherein the fluorinated compound is monochlorodifluoromethane.

3. A process as claimed in claim 1 wherein the fluorinated compound is dichlorodifluoromethane.

4. A process as claimed in claim 1 wherein the fluorinated compound is dichlorotetrafluoroethane.

5. A process as claimed in claim 1 wherein the fluorinated compound is monobromomonochlorodifluoromethane.

6. A process of preparing an improved soluble coffee which comprises extracting roasted coffee with a fluorinated compound having a boiling point at atmospheric pressure below 39° F. selected from the group consisting of

and $R_1F_2C-CF_2R_2$ wherein $R_1$ and $R_2$ are selected from the group consisting of hydrogen, chlorine, and bromine, under temperature and pressure conditions such that the fluorinated compound is in a liquid state, separating the liquid from the coffee, preparing an aqueous infusion of ground roasted coffee, drying the infusion to provide a soluble coffee powder, and incorporating in this soluble coffee powder material extracted by the fluorinated compound.

7. A process as claimed in claim 6 wherein the liquid separated from the coffee is mixed with the soluble coffee powder and the fluorinated compound is evaporated from the mixture.

8. A process as claimed in claim 6 wherein the fluorinated compound is evaporated from the liquid separated from the coffee and the resulting extract is mixed with the soluble coffee powder.

9. A process as claimed in claim 6 wherein at least part of the roasted coffee used in the preparation of the aqueous infusion has been solvent extracted and has been freed of solvent.

10. A process as claimed in claim 6 wherein the fluorinated compound is monochlorodifluoromethane.

11. A process as claimed in claim 6 wherein the flourinated compound is dichlorodifluoromethane.

12. A process as claimed in claim 6 wherein the fluorinated compound is dichlorotetrafluoroethane.

13. A process as claimed in claim 6 wherein the flourinated compound is monobromomonochlorodifluoromethane.

14. A process of preparing a coffee extract which comprises extracting roasted coffee with monochlorodifluoromethane in a liquid state, separating the liquid from the coffee and evaporating solvent from said liquid.

15. A process of preparing a coffee extract which comprises extracting roasted coffee with a solvent of dichlorodifluoromethane in a liquid state, separating the liquid from the coffee and evaporating the solvent from the liquid.

References Cited in the file of this patent

UNITED STATES PATENTS 2,345,378    Brandt _____ Mar. 28, 1944

OTHER REFERENCES

"Handbook of Material Trade Names," Zimmerman and Lavine, 1953 edition, page 245.

UNITED STATES PATENT OFFICE
CERTIFICATE OF CORRECTION

Patent No. 3,155,523                                  November 3, 1964

Ismar M. Reich

It is hereby certified that error appears in the above numbered patent requiring correction and that the said Letters Patent should read as corrected below.

Column 3, in the table, second column, line 9 thereof, for "$CCl_2-CClF_2$" read -- $CClF_2-CClF_2$ --.

Signed and sealed this 30th day of March 1965.

SEAL)
Attest:

ERNEST W. SWIDER                                        EDWARD J. BRENNER
Attesting Officer                                             Commissioner of Patents